United States Patent [19]
Fisk

[11] Patent Number: 5,805,958
[45] Date of Patent: Sep. 8, 1998

[54] SEAL BEARING ASSEMBLY FOR A DEVELOPMENT SYSTEM

[75] Inventor: Duane H. Fisk, Whitesville, N.Y.

[73] Assignee: Xerox Corporation, Stamford, Conn.

[21] Appl. No.: 622,274

[22] Filed: Mar. 27, 1996

[51] Int. Cl.⁶ .................................................. G03G 21/00
[52] U.S. Cl. ............................................. 399/98; 384/130
[58] Field of Search ................................. 399/119, 102,
399/98, 103, 222; 198/672; 384/129, 130

[56]  References Cited

U.S. PATENT DOCUMENTS 4,842,423   6/1989   Bhagwat .............................. 198/672 X
5,166,731  11/1992   Aimoto et al. ........................... 399/103
5,283,616   2/1994   Numagami et al. ................. 399/119 X
5,541,710   7/1996   Stewart et al. ............................. 399/98

*Primary Examiner*—S. Lee
*Attorney, Agent, or Firm*—Lloyd F. Bean, II

[57]  ABSTRACT

A seal bearing assembly for seal a rotating member in a development system is disclosed. The seal bearing assembly includes a seal assembly; a cutter, in contacted with the seal assembly, for cutting a portion of the seal assembly to seal the seal assembly about the member; and a bearing assembly, enclosed by the seal assembly, rotatingly supporting the member.

18 Claims, 5 Drawing Sheets

SEAL BEARING ASSEMBLY FOR A DEVELOPMENT SYSTEM

The present invention relates to a developer apparatus for electrophotographic printing, more specifically, the invention relates to a seal for sealing journals within a development system.

In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be image wise discharged in a variety of ways.

In the process of electrophotographic printing, the step of conveying toner to the latent image on the photoreceptor is known as "development." The object of effective development of a latent image on the photoreceptor is to convey developer material to the latent image at a controlled rate so that the developer material effectively adheres electrostatically to the charged areas on the latent image. At a development station, a development system or developer unit develops the latent image recorded on the photoconductive surface. A chamber in a developer housing stores a supply of developer material. To convey the developer material in the chamber to the latent image and to mix and triboelectrically charge the developer, a series of augers and magnetic rollers are strategically placed in the chamber and supported by the developer housing. Since these augers and rollers rotate, seal bearings are used to support the rollers at the housing.

One failure mode observed for the bearing/seal assembly is commonly the loss of conductivity between the outer roll casing and mounting shaft, in the system when bias is achieved by using conductive grease internal to the bearing. Because of the physical limited size of the bearing a brinell of the balls caused by skidding and insufficient load distribution this causes a viscoelastic force causing breakdown through temperature rise of the bearing and eventual loss of bias to the roll.

Temperature rise within the assembly is also caused by the elastomer lip seal which is also known as the outer or auxiliary seal. Because the outer seal is independent of the inter race of the bearing, tolerance buildup and misalignment of the bearing bore to I.D. (inner diameter) of the seal causes tight contact areas or voids around the shaft diameter which allows replenisher material to contaminate the bearing. The extreme rise in temperature causes agglomerates to form and eventually mix into the developer material.

The harsh environment of carrier and core has been found to degrade the elastomer auxiliary seal which is exposed directly to the material. Once the lip seal is fractured the small toner particle dust will enter the assembly and soon push past the fragile bearing seal and seize the bearing.

It is highly desirable to have seal bearing which can with stand the harsh environment, and overcomes the before invention problems.

Pursuant to an aspect of the invention there is provided a system for sealing a member rotating about an axis of a support. The system includes a seal assembly, the seal assembly in contacted with a cutter for cutting a portion of the seal assembly to seal the seal assembly about the member. A bearing assembly is enclosed by said seal assembly, and rotatingly support the member. Pursuant to another aspect of the invention there is provided a developer unit adapted to develop an electrostatic latent image, said developer unit of the type having a system for sealing a member rotating about an axis of a support, wherein the system includes a seal assembly, the seal assembly in contacted with a cutter for cutting a portion of the seal assembly to seal the seal assembly about the member. A bearing assembly is enclosed by said seal assembly, and rotatingly support the member These and other aspects of the invention will become apparent from the following description used to illustrate a preferred embodiment of the invention read in conjunction with the accompanying drawings.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Inasmuch as the art of electrophotographic printing is well known, the various processing stations employed in the FIG. 5 printing machine will be shown hereinafter schematically and their operation described briefly with reference thereto.

Figure 1:
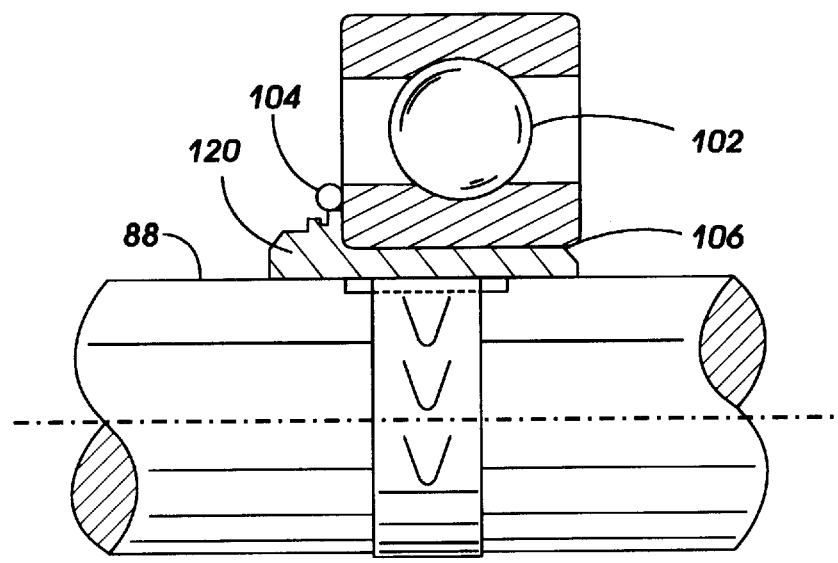
FIGS. 1–4 are a partial sectional view of a seal for a development housing according to the present invention.
Figure 2:
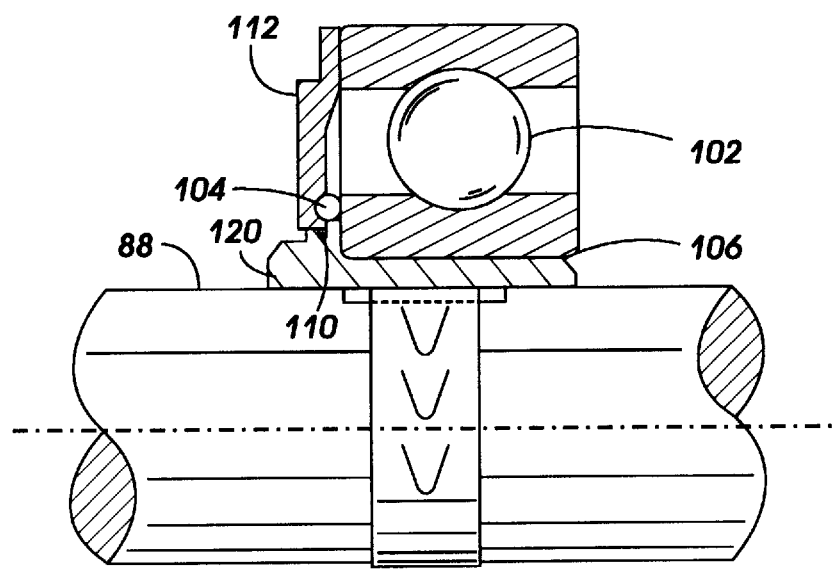
Figure 3A:
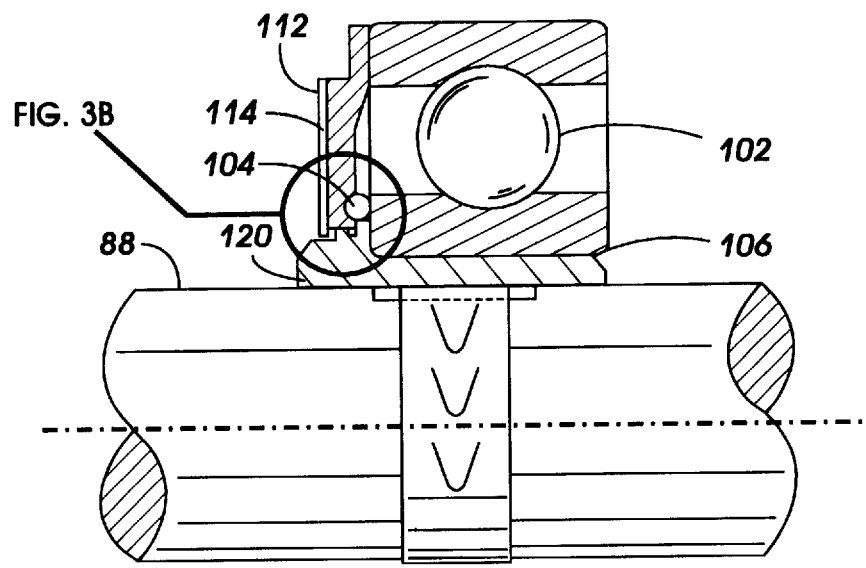
Figure 3B:
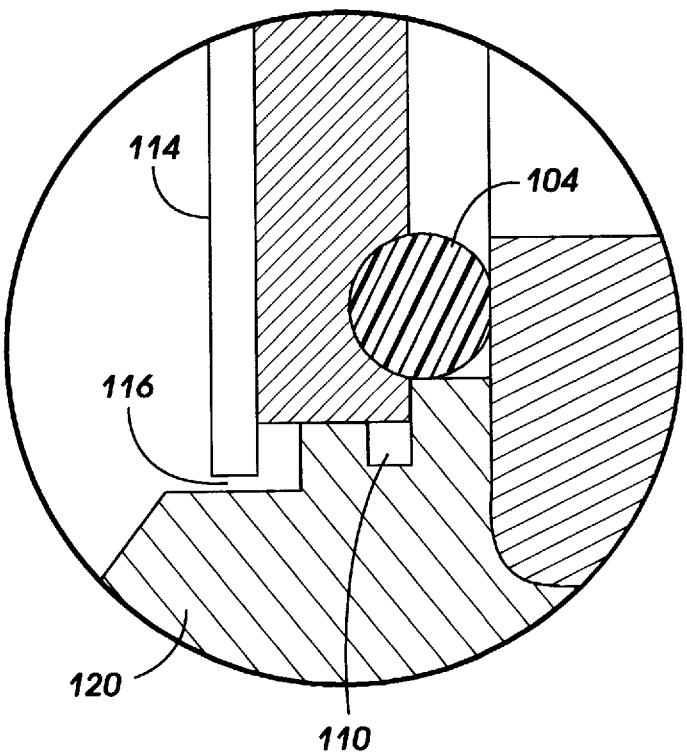
Figure 4:
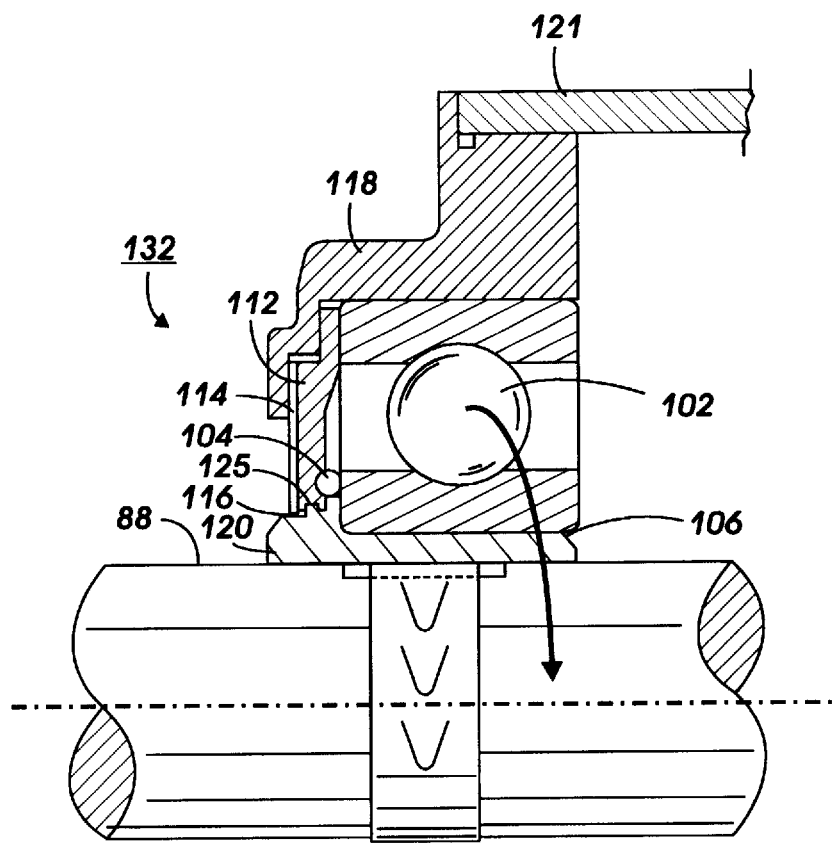
Figure 5:
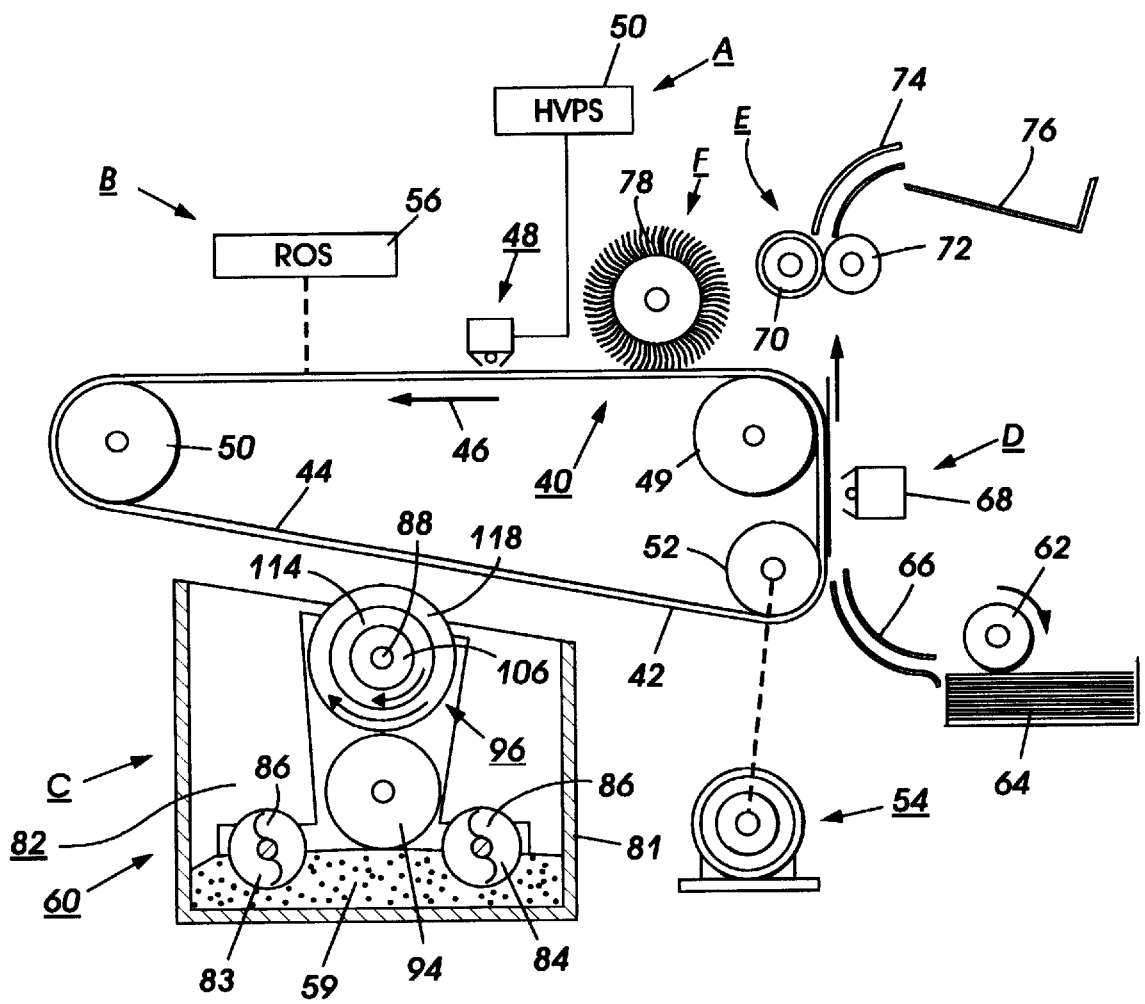
FIG. 5 is a schematic elevational view of an illustrative electrophotographic printing machine incorporating the seal for the development housing of the present invention therein.

Referring initially to FIG. 5, there is shown an illustrative electrophotographic printing machine incorporating the development apparatus of the present invention therein. The printing machine incorporates a photoreceptor 40 in the form of a belt having a photoconductive surface layer 42 on an electroconductive substrate 44. Preferably the surface 42 is made from a selenium alloy. The substrate 44 is preferably made from an aluminum alloy or a suitable photosensitive organic compound. The substrate 44 is preferably made from a polyester film such as Mylar (a trademark of Dupont (UK) Ltd.) which has been coated with a thin layer of aluminum alloy which is electrically grounded. The belt is driven by means of motor 54 along a path defined by rollers 49, 50 and 52, the direction of movement being counter-clockwise as viewed and as shown by arrow 46. Initially a portion of the belt 40 passes through a charge station A at which a corona generator 48 charges surface 42 to a relatively high, substantially uniform, potential. A high voltage power supply 50 is coupled to device 48.

Next, the charged portion of photoconductive surface 42 is advanced through exposure station B. At exposure station B, ROS 56 lays out the image in a series of horizontal scan lines with each line having a specified number of pixels per inch. The ROS includes a laser having a rotating polygon mirror block associated therewith. The ROS exposes the charged photoconductive surface of the printer.

After the electrostatic latent image has been recorded on photoconductive surface 42, belt 40 advances the latent image to development station C as shown in FIG. 5. At development station C, a development system or developer unit 60, develops the latent image recorded on the photoconductive surface. The chamber in developer housing 81 stores a supply of developer material 59. The developer material 59 may be a two component developer material of at least magnetic carrier granules having toner particles adhering triboelectrically thereto. It should be appreciated that the developer material may likewise comprise a one component developer material consisting primarily of toner particles.

Again referring to FIG. 5, after the electrostatic latent image has been developed, belt 40 advances the developed image to transfer station D, at which a copy sheet 64 is advanced by roll 62 and guides 66 into contact with the developed image on belt 40. A corona generator 68 is used to spray ions on to the back of the sheet so as to attract the toner image from belt 40 to the sheet. As the belt turns around roller 48, the sheet is stripped therefrom with the toner image thereon.

After transfer, the sheet is advanced by a conveyor. (not shown) to fusing station E. Fusing station E includes a heated fuser roller 70 and a back-up roller 72. The sheet passes between fuser roller 70 and back-up roller 72 with the toner powder image contacting fuser roller 70. In this way, the toner powder image is permanently affixed to the sheet. After fusing, the sheet advances through chute 74 to catch tray 76 for subsequent removal from the printing machine by the operator.

After the sheet is separated from photoconductive surface 42 of belt 40, the residual developer material adhering to photoconductive surface 42 is removed therefrom by a rotatably mounted fibrous brush 78 at cleaning station F in contact with photoconductive surface 42. Subsequent to cleaning, a discharge lamp (not shown) floods photoconductive surface 42 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the development apparatus of the present invention therein.

According to the present invention and referring to FIG. 5, a developer seal 132 for sealing shaft 88 is shown incorporated into the developer unit 60 of FIG. 5. Referring to FIG. 5, developer housing 81 forms chamber 82 in which the developer material 59 is stored. The developer material 59 is agitated and distributed by first and second augers 83 and 84, respectively, located in the chamber 82. The augers 83 and 84 may have any suitable shape but typically, include spiral flights 86 which extend from centrally located shafts. Transport roll 94 is also located in the chamber 82 and is used to transport developer material 59 to donor roll 96. The donor roll 96 is also located in the chamber 82 and is used to transport the developer material 59 to the photoconductive belt 40.

The developer housing 81 can be made from any suitable durable material, such as a metal, durable plastic, or a composite material. For example, the developer housing 81 may be inexpensively made of molded plastic.

Referring to FIGS. 1–4, the bearing/seal design of the present invention employs a bushing 106; preferably stainless steel, that is light pressed into for example, 12 mm I.D.×28 O.D. bore of radial ball bearing 102 with shields.

The bushing effectively becomes an extension of the bearing inner race. The wafer style labyrinth seal 112 is assemble onto the bushing 106 keeping an exacting relationship of the seal to bearing bores. The first component in the three stage seal is "O" ring 104, preferably made from a non-stick surface such as Teflon, a trademark of DuPont (UK) Ltd., which is stretched over the largest bushing shoulder and is biased against the face of the inner race of the bearing.

The second component is a conductive polyolefin washer shaped labyrinth seal which is pressed onto the bushing 106 wherein there is an interference fit between 0.001 to 0.002 inches. The present invention has a self seating feature wherein the seal 112 forms an inner groove 125 which is milled by a portion of the bushing 106 having a ribbed cutter 120. The forming of the inner groove 123 does not take place until final assembly when outer cap 118 with the outer surface 121 of the donor roll 96 connected thereto is pressed on and in running operation. Fore and Aft debris sumps 116 and 110 in the bushing collects any plastic material from the seating operation.

A shield 114 slip fits over the remaining shoulder of the bushing 106 against the seal 112. Preferably, the shield is for example 0.015 inch thick tempered ceramic plated stainless steel. An unique feature of this shield is that the bore is within 0.001 inch radial clearance to the O.D. outer diameter of the bushing, this tightly controlled fit is accomplished by a fine blanking procedure of the bore. The ceramic plating acts as a heat shield transferring heat build up away from stub shaft end of the seal to the aluminum cap which serves as an effective heat sink.

Having in mind the construction and arrangement of the principal element thereof, it is believe a complete understanding of the present invention may now be had from a description of its operation. During initial operation labyrinth seal is self-seated by the milling of a groove formed therein by ribbed cutter 120 as outer surface 121, outer cap 118, seal 112 and shield 114 rotates about shaft 88 with bushing 106 affixed thereto. The highly abrasive larger carrier and core particles (40 micron and larger) are blocked out from the plastic labyrinth seal by the outer tempered stainless steel shield. Ceramic plating on the outer shield is virtually unaffected by the abrasive action of the replenisher material. The ceramic stainless steel outer shield helps to transfer internal bearing/seal temperature rise away from the shaft and seal bore to the aluminum cap which acts as an effective heat sink, this greatly reduces the buildup of fused toner particles around the shaft resulting in agglomerates forming. The self sealing characteristics of the polyolefin has good thermal stability and is unaffected by age or humidity. Preferably, the seal is conductive (greater than 3K ohm/cm) which eliminates having to rely on conductive grease internal to the radial bearing. The seal has excellent abrasion resistance so that roll bias is maintained with minimal wear after initial "seating" of the seal. The seal forms an excellent barrier against smaller carrier/core material by its contact to the busing "cutter" through its inner groove formed by the seating operation. This stage seals out the remainder of the carrier/core and most all of the less abrasive toner particles. The last stage or inner seal is a Teflon® "O" ring which acts as the final or smallest particle barrier. The Teflon® is far superior to elastomer "O" rings because of its excellent sealing over wide operating temperature ranges. The Teflon® seal is excellent for reducing operating temperature under frictional load, the Teflon® composition of the ring acts as a good "bearing" surface contacting the seal and inner race of the radial bearing.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A system for sealing a member rotating about an axis of a support, comprising:

a seal assembly a cutter, in contacted with said seal assembly, for cutting a portion of the seal assembly to seal said seal assembly about the member; and a bearing assembly, enclosed by said seal assembly, rotatingly supporting said member.

2. The system according to claim 1, wherein bearing assembly includes said cutter.

3. The system according to claim 1, wherein said cutter cuts said seal only during initial rotation of said member.

4. The system according to claim 1, further comprising means for removing said cut portion of said seal assembly.

5. The system according to claim 1, wherein said seal assembly includes a labyrinth shaped seal.

6. The system according to claim 5, wherein said cutter has a ribbed configuration which forms an inner groove in said labyrinth shaped seal.

7. The system according to claim 5, wherein said seal assembly includes an O ring positioned between said labyrinth shaped seal and said bearing assembly.

8. The system according to claim 5, wherein said seal assembly includes a shield and a cap which encloses said labyrinth shaped seal.

9. The system according to claim 1, wherein said seal assembly is conductive.

10. A developer unit for developing an electrostatic latent image, said developer unit having a system for sealing a member rotating about an axis of a support, wherein the system comprises:

a seal assembly;

a cutter, in contacted with said seal assembly, for cutting a portion of the seal assembly to seal said seal assembly about the member; and a bearing assembly, enclosed by said seal assembly, rotatingly supporting said member.

11. The system according to claim 10, wherein bearing assembly includes said cutter.

12. The system according to claim 10, wherein said cutter cuts said seal only during initial rotation of said member.

13. The system according to claim 10, further comprising means for removing said cut portion of said seal assembly.

14. The system according to claim 10, wherein said seal assembly includes a labyrinth shaped seal.

15. The system according to claim 14, wherein said cutter has a ribbed configuration which forms an inner groove in said labyrinth shaped seal.

16. The system according to claim 14, wherein said seal assembly includes an O ring positioned between said labyrinth shaped seal and said bearing assembly.

17. The system according to claim 14, wherein said seal assembly includes a shield and a cap which encloses said labyrinth shaped seal.

18. The system according to claim 10, wherein said seal assembly is conductive.

* * * * *